(12) United States Patent
Yliniemi (10) Patent No.: US 6,749,211 B1
(45) Date of Patent: Jun. 15, 2004

(54) BICYCLE WITH RECIPROCAL PEDAL LEVERS HAVING SHIFTABLE PIVOT AXIS FOR TRANSMISSION RATIO CHANGE

(76) Inventor: Hugo H. Yliniemi, 37399 5$^{th}$ Avenue Way, Dennison, MN (US) 55018

( * ) Notice: Subject to any disclaimer, the term of this patent is extended or adjusted under 35 U.S.C. 154(b) by 0 days.

(21) Appl. No.: 10/402,630

(22) Filed: Mar. 28, 2003

(51) Int. Cl.$^7$ ............................................. B62M 1/00
(52) U.S. Cl. ......................... 280/254; 280/255; 280/258
(58) Field of Search .......................... 280/288.1, 253, 280/254, 255, 258, 244, 245; 482/52, 57, 70, 72, 74, 66

(56) References Cited

U.S. PATENT DOCUMENTS

| | | | | |
|---|---|---|---|---|
| 3,888,512 A | * | 6/1975 | Peterson | ...................... 280/255 |
| 3,954,282 A | | 5/1976 | Hege | |
| 4,300,784 A | | 11/1981 | Efros | |
| 5,007,655 A | * | 4/1991 | Hanna | ...................... 280/250.1 |
| 5,335,927 A | | 8/1994 | Islas | |
| 5,536,072 A | * | 7/1996 | Chang | .................... 297/423.45 |
| 5,785,337 A | | 7/1998 | Ming | |
| 5,857,941 A | * | 1/1999 | Maresh et al. | ................. 482/52 |
| 6,080,088 A | * | 6/2000 | Petersen et al. | ............... 482/72 |
| 6,361,476 B1 | * | 3/2002 | Eschenbach | .................. 482/52 |
| 6,412,802 B1 | * | 7/2002 | Kugel et al. | ................. 280/252 |
| 6,578,861 B2 | * | 6/2003 | Park | ........................... 280/252 |

* cited by examiner

Primary Examiner—Daniel G. DePumpo
(74) Attorney, Agent, or Firm—James W. Miller (57) ABSTRACT

This invention relates to a cycle, such as a bicycle, having reciprocal pedal levers for propelling at least one wheel of the cycle. The cycle has a frame that includes a rack, a left pedal lever with a rack and a right pedal lever with a rack. A pinion is carried on the frame with the pinion in simultaneous engagement with the racks on the frame and the pedal levers. A plurality of bearings are mounted around the pinion comprising at least a first bearing providing rotation between the pinion and the frame, a second bearing providing rotation between the pinion and the right pedal lever, and a third bearing providing rotation between the pinion and the left pedal lever.

20 Claims, 13 Drawing Sheets

BICYCLE WITH RECIPROCAL PEDAL LEVERS HAVING SHIFTABLE PIVOT AXIS FOR TRANSMISSION RATIO CHANGE

TECHNICAL FIELD

This invention relates to a manually propelled cycle, such as a bicycle, having pedal levers that pivot about a pivot axis to permit the pedal levers to move in a reciprocal fashion to propel the cycle as the user reciprocates the pedal levers up and down. More particularly, this invention relates to a cycle in which the pivot axis is shiftable to selectively vary the transmission ratio of the cycle.

BACKGROUND OF THE INVENTION

Various types of manually propelled cycles are known such as bicycles and tricycles. A typical bicycle includes a frame, a front wheel and a rear wheel rotatably carried on the frame, a seat for the operator, a steering handle to steer the bicycle, and rotary pedals for propelling the bicycle. The pedals are part of a rotary crank mechanism that is connected by a chain and sprocket drive to the hub of the rear wheel. The sprocket drive is adjustable for varying the sprocket ratio to vary the speed of the bicycle for a given amount of effort by the operator by varying the transmission ratio. Tricycles are similar but have a pair of rear wheels instead of a single rear wheel.

Some bicycles are known which use reciprocal pedal levers instead of pedals on a rotary crank. In these cycles, each pedal lever is pivotally connected to the bicycle frame with the pedal lever having a foot operated pedal carried on one end. The other end of the pedal lever is connected by flexible motion transmitting members to one of the wheels of the bicycle, typically to the rear wheel, so that up and down reciprocal motion of each pedal lever is converted into rotary motion of the wheel. The operator sits on the seat and propels the bicycle by reciprocating the pedal carrying ends of the pedal levers up and down.

U.S. Pat. No. 3,888,512 to Peterson, U.S. Pat. No. 3,954,282 to Hege, U.S. Pat. No. 4,300,784 to Efros, U.S. Pat. No. 5,335,927 to Islas, and U.S. Pat. No. 5,785,337 to Ming all disclose bicycles of the reciprocal pedal lever type. Many people consider such bicycles easier to ride than bicycles having pedals carried on rotary cranks. This is thought to be due to the up and down motion of the legs that is required to reciprocate the pedal levers up and down. This up and down leg motion is easier and more comfortable for many people than having to rotate the leg and foot in a complete circle. There is less motion involved and less stress on the user's joints in accomplishing reciprocal pedal action than complete circular rotation of the pedals.

One difficulty with bicycles having reciprocal pedal levers is the ability to change the transmission ratio. In a bicycle having a conventional rotary crank, the hub of the rear wheel often has a plurality of transmission ratio change sprockets. The transmission ratio change is accomplished by shifting the chain from one sprocket to the next to change the transmission ratio. The use of hubs with multiple transmission ratio change sprockets and the derailleurs for moving the chain between the sprockets is well developed in rotary crank bicycles.

However, for bicycles with reciprocal pedal levers, the mechanisms for changing the transmission ratio are much less well developed. The Efros patent referenced above teaches a system of changing transmission ratio by changing the location of where the force transmitting member connects to the pedal lever. The Peterson patent referenced above teaches shifting the pivot axis about which the pedal levers pivot. However, both of these approaches have been executed in fairly complicated and expensive ways. A need exists in the art for a cycle with reciprocal pedal levers that has a simple, durable and reliable mechanism for changing the transmission ratio of the cycle.

SUMMARY OF THE INVENTION

One aspect of this invention relates to a manually propelled cycle. The cycle comprises a frame which is supported for rolling over the ground by a front wheel and at least one rear wheel. Both wheels are rotatably carried on the frame. A seat is provided on the frame to accommodate a seated operator. A steering handle is provided on the frame to steer the frame. Reciprocal pedal levers are connected to the frame for pivoting about a pivot axis. Each pedal lever is connected to a motion transmitting member for transmitting reciprocal motion of the pedal lever to a hub of one of the wheels on the frame for propelling the frame. The frame and the pedal levers each have at least one rack affixed thereto. The pivot axis of the pedal levers is formed by a pinion engaged with the racks on the frame and the pedal levers. A plurality of bearings are received around the pinion with at least one bearing extending between the pinion and the frame and at least one bearing extending between the pinion and each of the pedal levers.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Referring first to FIGS. 1–7, a first embodiment of a manually propelled cycle according to this invention is illustrated generally as a bicycle 2. Bicycle 2 comprises a frame 4 which is supported for rolling over the ground by a front wheel 6 and a rear wheel 8. Both wheels 6 and 8 are rotatably carried on frame 4 in any suitable manner. A seat 10 is provided on frame 4 to accommodate a seated operator. A steering handle 12 is provided on frame 4 to swing or steer front wheel 6 from side-to-side to steer frame 4.

A pair of pedal levers 14 is pivoted to frame 4 to pivot about a pivot axis 16 formed by the axis of a transversely arranged pinion 18. Pinion 18 passes through an intermediate portion 20 of pedal lever 14. The rear end 22 of pedal lever 14 carries a foot engaging pedal 24. The front end 26 of pedal lever 14 has a hole 28 for attaching a flexible motion transmitting member 30 thereto.

Various forms of motion transmitting members 30 can be connected to pedal levers 14. As shown in FIGS. 1–7, motion transmitting members 30 can comprise a first section of flexible cable 32 entrained around a pulley 33 carried on frame 4, a second section of chain 34, and a third section comprising a spring 36. The free end of spring 36 is hooked to a bracket 38 on the steering post of frame 4. The section of chain 34 is entrained around a small drive sprocket 40 carried on one side of the hub of front wheel 6.

An identical motion transmitting member 30 is used to couple each pedal lever 14 to its own individual drive sprocket 40 on the hub of front wheel 6. The purpose of each motion transmitting member 30 is simply to convert up and down reciprocal motion of the front ends 26 of pedal levers 14 into rotary motion of drive sprockets 40 and thus into rotary motion of front wheel 6 of bicycle 2 to propel bicycle 2 over the ground. Pedal levers 14 are alternately disposed relative to one another such that the front end 26 of one pedal lever 14 is moving up as the front end 26 of the other pedal lever 14 is moving down. Thus, at least one pedal lever 14 is always driving front wheel 6 through its associated motion transmitting member 30 and drive sprocket 40. It would also be possible to propel bicycle 2 by pushing down on on both pedal levers 14 at the same time in a jackrabbit type fashion, though alterate up and down, opposed motion of pedal levers 14 would be more normal.

Figure 3:
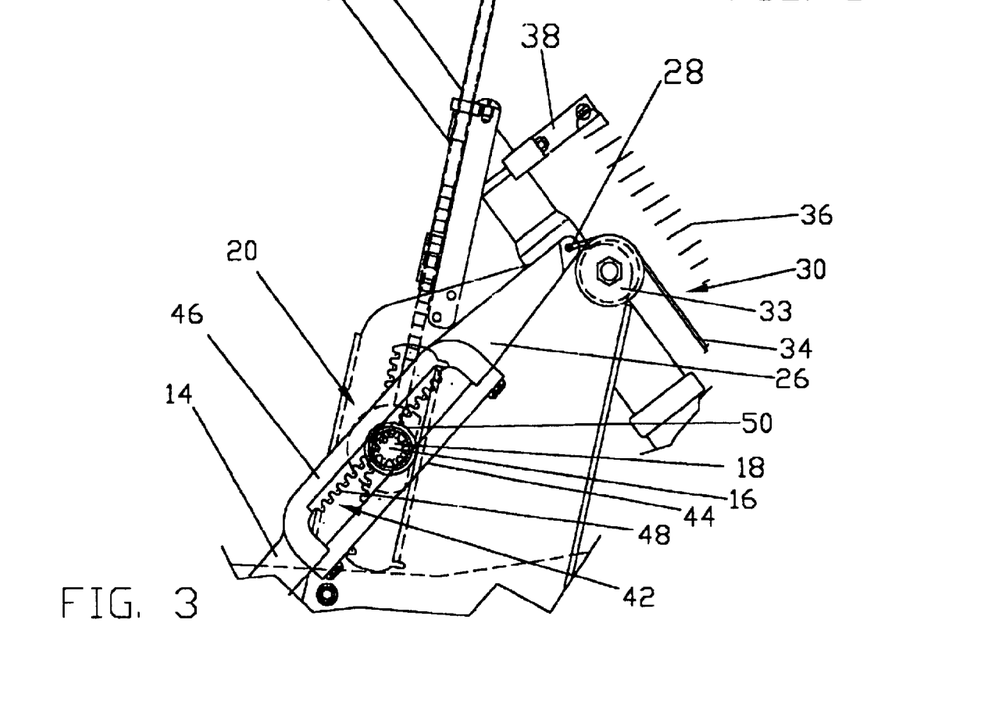
FIG. 3 is a partial side elevational view of the bicycle shown in FIG. 1, particularly illustrating one of the pedal levers and the pinion and bearing about which the pedal lever pivots.
Figure 7:
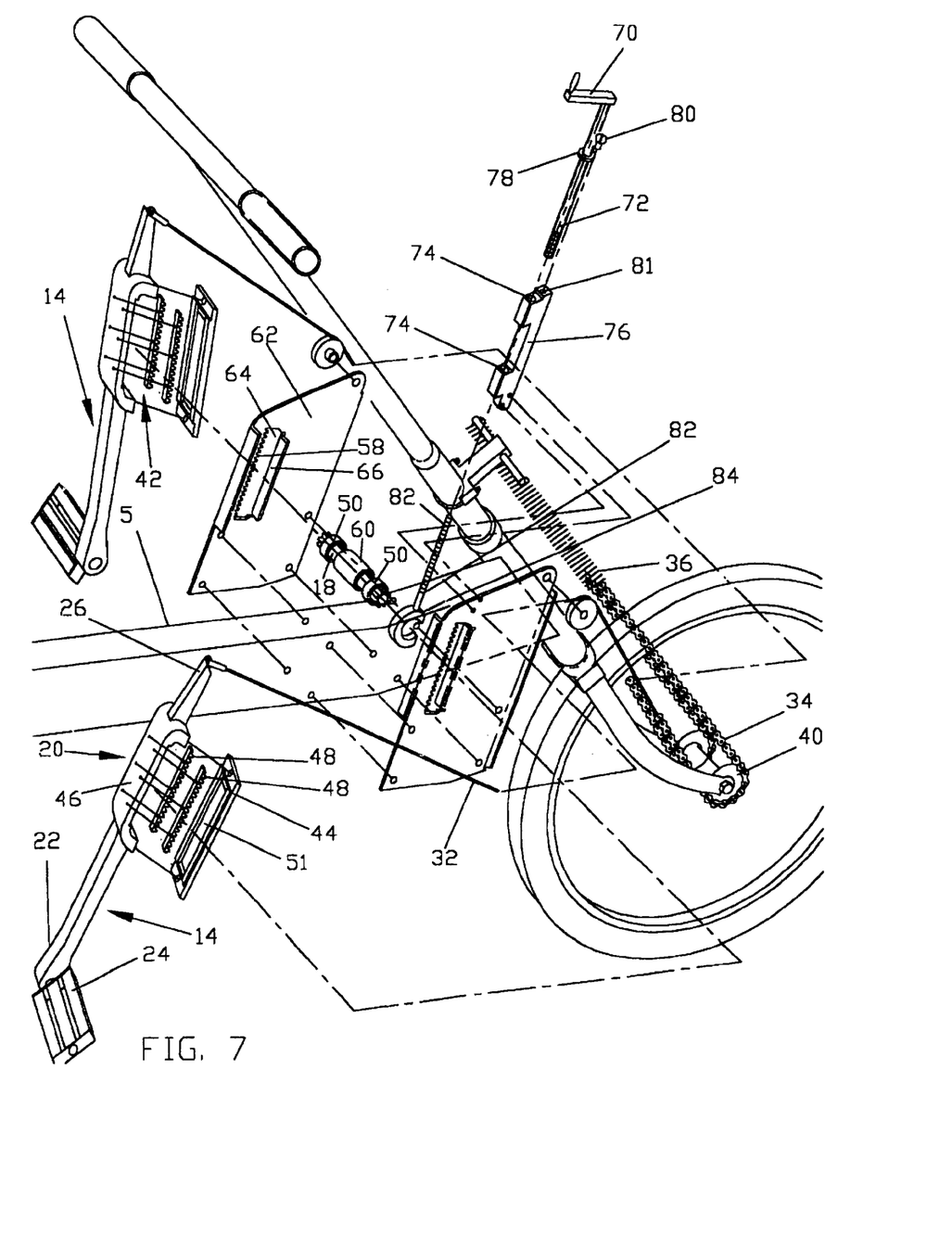
FIG. 7 is an exploded perspective view of portions of the bicycle shown in FIG. 1.

Pinion 18 that forms pivot axis 16 for pedal levers 14 passes through a slot 42 in the intermediate portion of each pedal lever. As shown in FIGS. 3 and 7, slot 42 is formed by bolting a cover plate 44 to a U-shaped cavity 46 that is cast into or otherwise integrally formed with pedal lever 14. A pair of toothed racks 48 are also bolted or fixed to the base of cavity 46. The teeth in racks 48 are shaped to engage with the teeth of pinion 18. Racks 48 when attached to cavity 46 are parallel to one another and are positioned along opposite sides of slot 42 with one rack 48 being located along an outer side of slot 42 and the other rack 48 being located along an inner side of slot 42. See FIG. 4.

Figure 4:
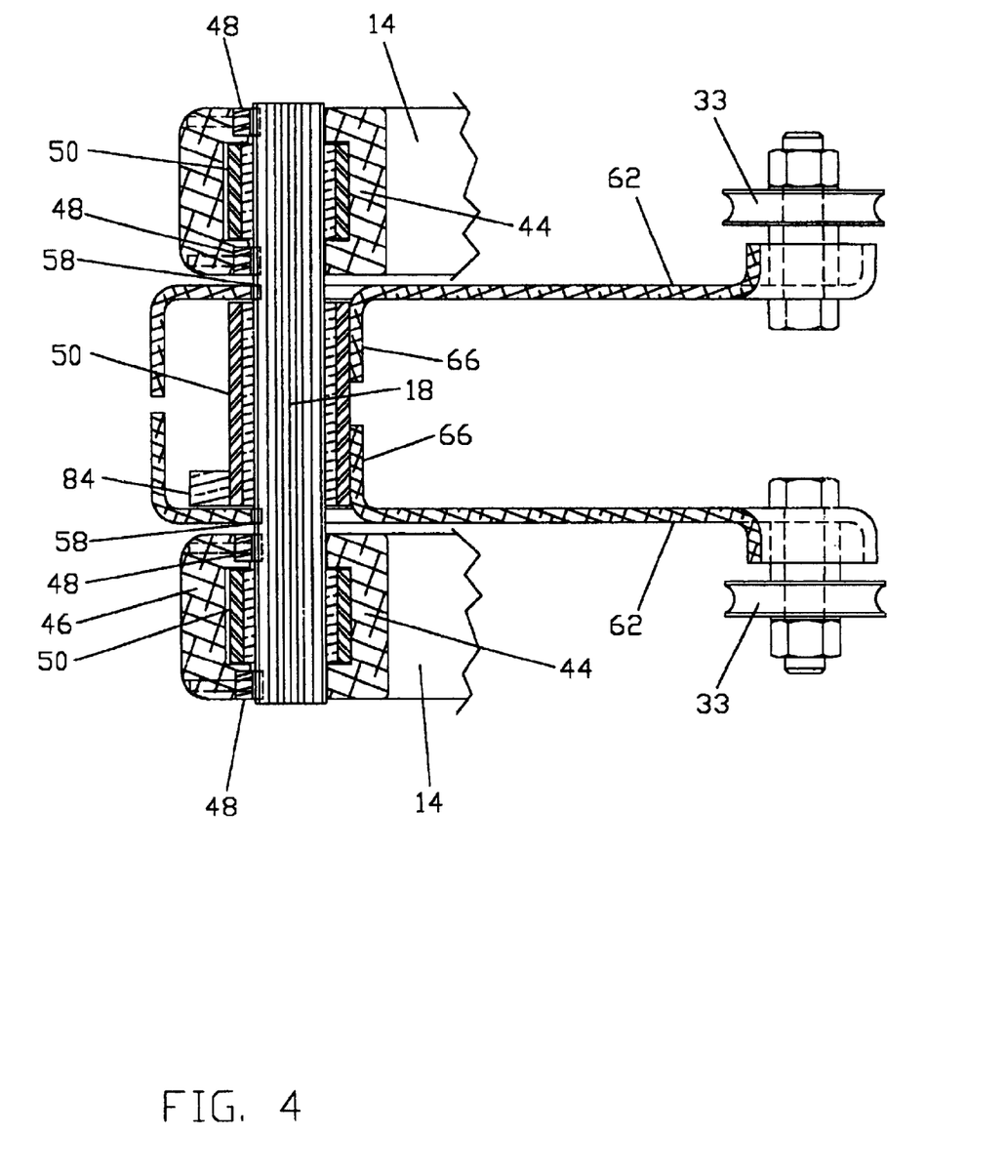
FIG. 4 is a cross-sectional view of the bicycle shown in FIG. 1 taken along lines 4—4 of FIG. 1, particularly illustrating the pinion and bearings received in the bicycle frame and in both pedal levers.
Figure 5:
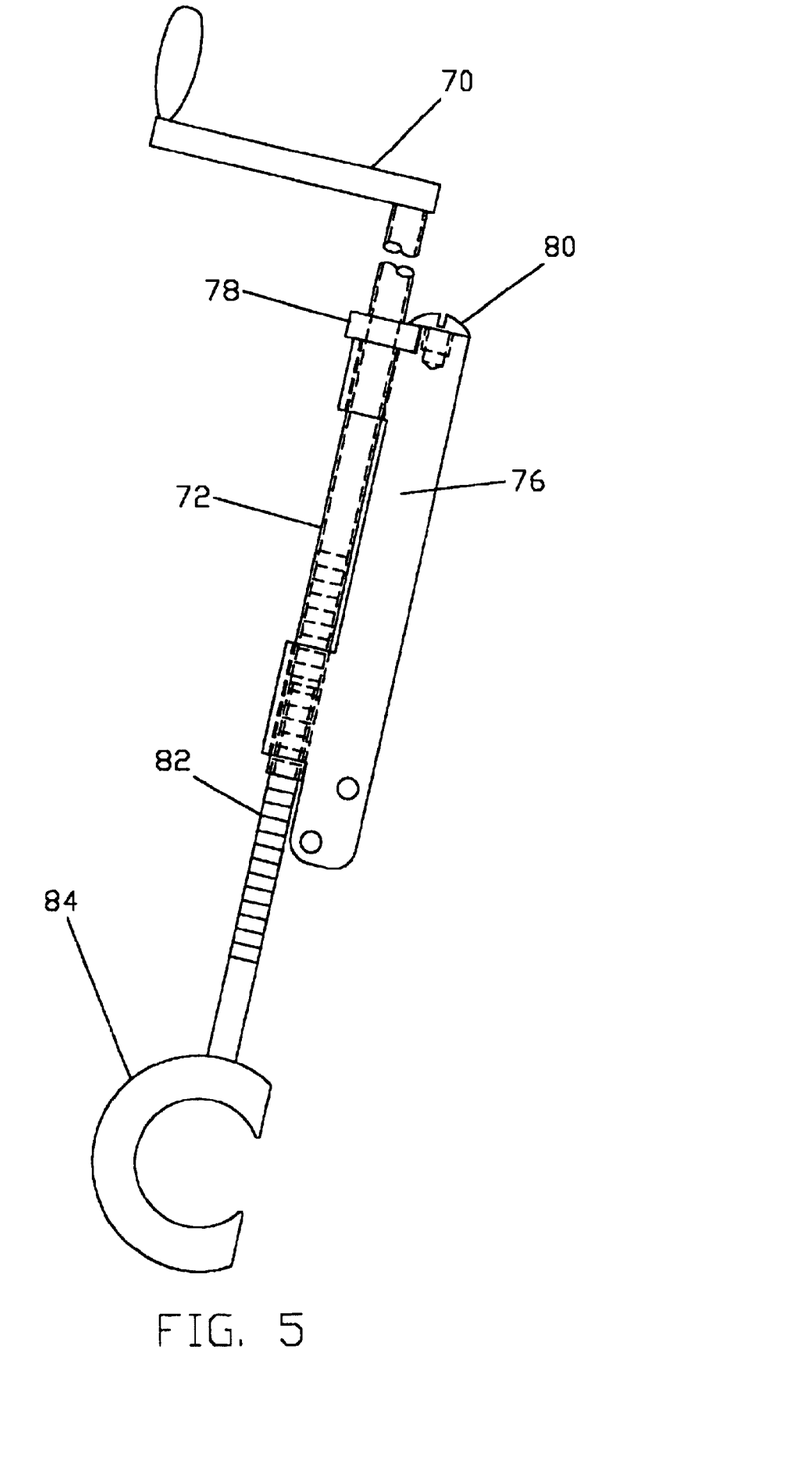
FIG. 5 is a side elevational view of one of the components of the bicycle shown in FIG. 1, particularly illustrating a rotary handle for shifting the pivot axis of the pedal levers.
Figure 6:
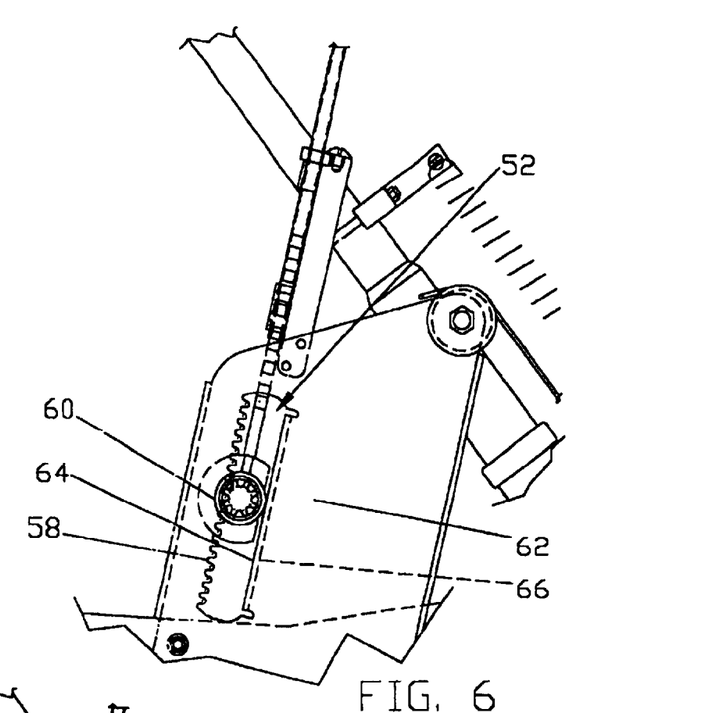
FIG. 6 is a partial side elevational view similar to FIG. 3 of the bicycle shown in FIG. 1, particularly illustrating the frame of the bicycle and the pinion and bearing received in the frame of the bicycle.

As best shown in FIGS. 4 and 7, a bearing 50 is placed around each end of pinion 18. Any suitable bearing 50 may be used, but preferably bearing 50 is simply press fit onto the end of pinion 18 with the teeth of pinion 18 simply being pressed into engagement with an inner diameter or race of bearing 50. Slot 42 in pedal lever 14 is shaped to receive bearing 50 therein between the spaced parallel racks 48. In this regard, cover plate 44 bolted to U-shaped cavity 45 includes a central depression 51 for providing sufficient space to receive bearing 50. Thus, as shown most clearly in FIG. 4, each end of pinion 18 has a bearing 50 that is received in the middle of slot 42 with each side of slot 42 having a rack 48 that engages the teeth on pinion 18 on either side of bearing 50.

Figure 1:
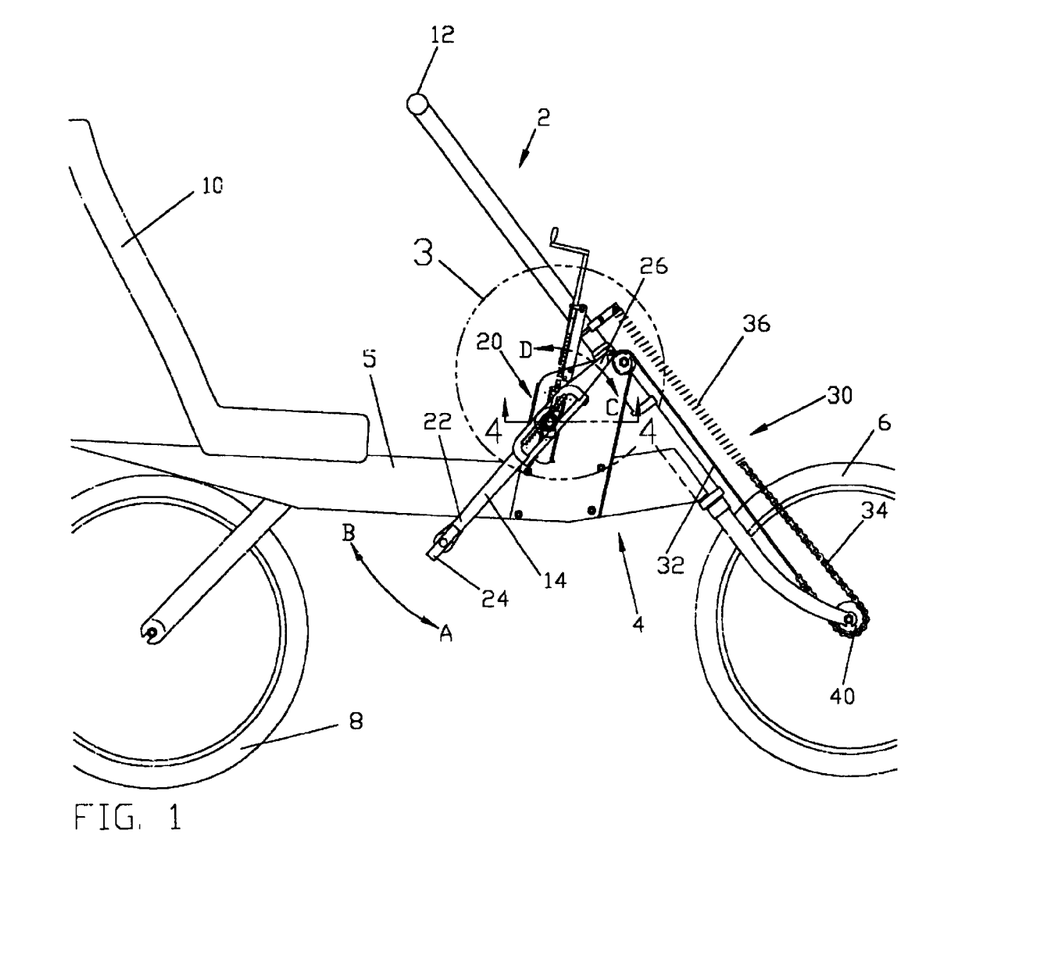
FIG. 1 is a side elevational view of a first embodiment of a bicycle according to this invention.
Figure 2:
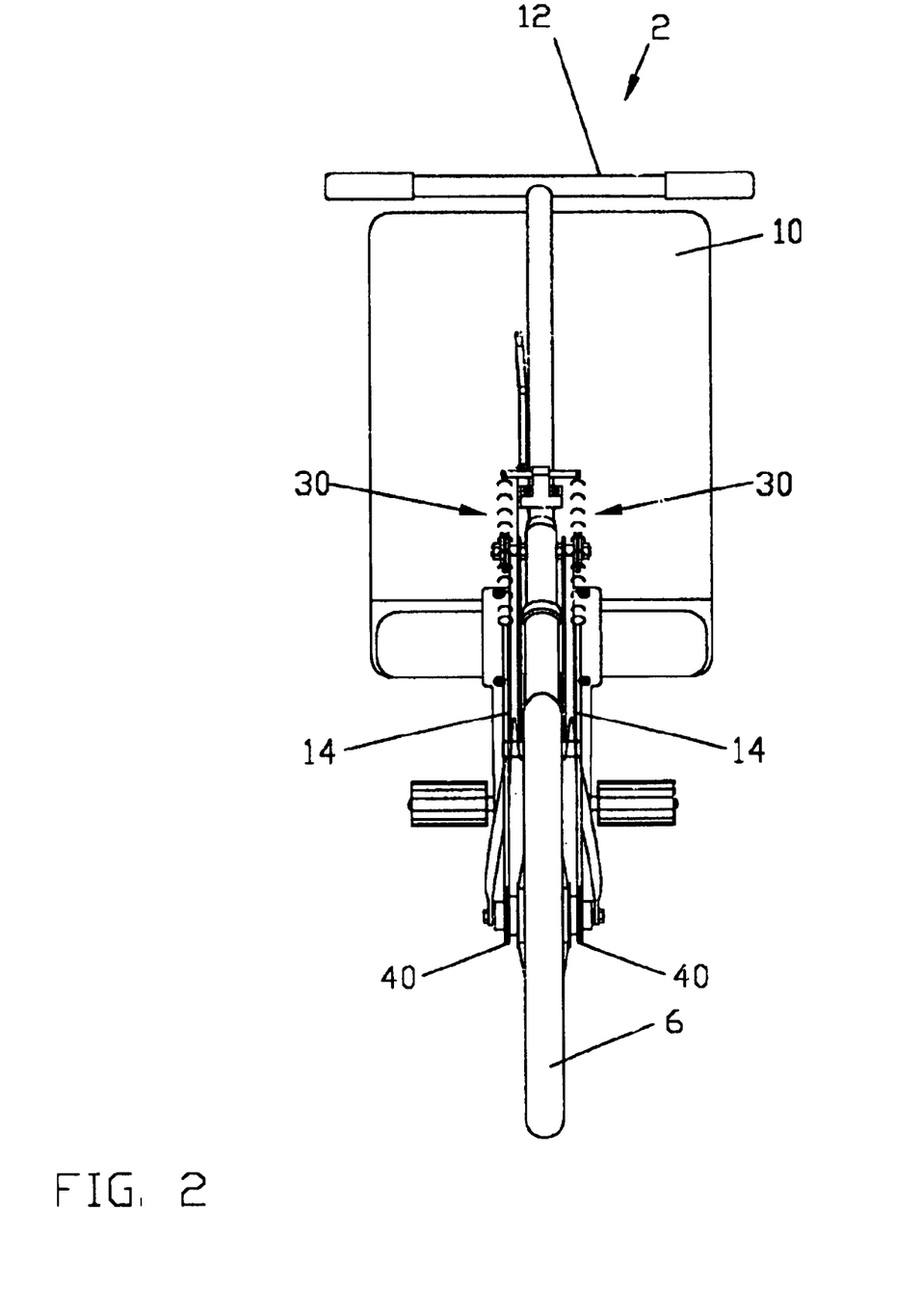
FIG. 2 is a front elevational view of the bicycle shown in FIG. 1.

Frame 4 also includes a slot 52 having a pair of parallel racks 58 on either side of slot 42. Similarly to slots 42 in pedal levers 14, slot 52 in frame 4 also includes a middle portion that receives a bearing 60 press fit around the middle of pinion 18. Slot 52 is a fixed part of frame 4, extends generally vertically, and does not change its orientation. Slots 42 in pedal levers 14 will pivot back and forth relative to a horizontal line as pedal levers 14 are moved up and down. Thus, the particular orientation of slot 42 in pedal lever 14 shown in FIG. 1 represents the orientation of slot 42 only in the particular position of pedal lever 14 that is shown in FIG. 1.

Slot 52 in frame 4 can be provided in various ways. One way is to bolt or otherwise secure a pair of side plates 62 to opposite sides of a central member 5 of frame 4 as shown in FIG. 7. Each side plate 62 has a slotted passageway 64 formed therein along with a side wall 66 extending inwardly from side plate 62 immediately adjacent to one side of and along the length of slotted passageway 64. Each slotted passageway 64 has a rack 58 integrally formed along one side thereof such that the teeth of rack 58 are simply cut into that side of slotted passageway 64. When side plates 62 are assembled to central member 5 of frame 4, slotted passageways 64 in side plates 62 form the opposite sides of slot 52 with racks 58 in side plates 62 forming the racks 58 carried on the opposite sides of slot 52. Side walls 66 on side plates 62 extend toward each other and together form a surface on which bearing 50 rests.

Frame 4 of bicycle 2 carries a rotary handle 70 that is accessible to an operator seated on seat 10. Rotary handle 70 has a downwardly depending stem 72 that is threaded on its lower end. Stem 72 of rotary handle 70 is rotatably received through spaced bores 74 on a support bracket 76 affixed to frame 4. See FIGS. 5 and 7. Rotary handle 70 carries an enlarged flange 78 that rests on top of bracket 76. The head of a screw 80 overlies flange 78 on rotary handle 70 such that screw 80 prevents rotary handle 70 from being pulled up out of bracket 76 when rotary handle 70 is rotated. Screw 80 bottoms in a threaded bore 81 in bracket 76 before the head of screw 80 has clamped itself against flange 78 such that screw 80 simply retains rotary handle 70 on bracket 76 without preventing the rotation of rotary handle 70 since rotary handle 70 must be able to rotate relative to frame 4.

The lower end of stem 72 is hollow and the threads on the lower end of stem 72 are on an inner diameter of the lower end of stem 72 and not on the outer diameter of stem 72. A threaded adjustment rod 82 has its upper end threaded into the hollow lower end of stem 72. The lower end of adjustment rod 82 includes a C-shaped bracket 84. Adjustment rod 82 extends down between side plates 62 that carry slot 52 in frame 4. C-shaped bracket 84 on the lower end of adjustment rod 82 surrounds a portion of bearing 50 carried in slot 52 of frame 4, bearing 50 surrounding a middle portion of pinion 18. See FIG. 4.

Bicycle 2 operates much like any bicycle having reciprocal pedal levers 14. As the operator sits on seat 10, the operator places both feet on the pedals 24 of pedal levers 14 to reciprocate the pedal carrying ends of pedal levers 14 back and forth along a slight arc as represented by the arrows A and B in FIG. 1. As each pedal lever 14 is so reciprocated, it pivots about pivot axis 16 formed by the axis of pinion 18. Front ends 26 of pedal levers 14 are then also moved reciprocally as indicated by the arrows C and D in FIG. 1. Each front end 26 of pedal lever 14 will rotate drive sprocket 40 forwardly in one direction, but will not rotate drive sprocket 40 rearwardly in the other direction due to the use of a one way clutch (not shown) between drive sprockets 40 and the hub of front wheel 6. Thus, the out of phase motion of pedal levers 14 drives front wheel 6 in a forward rotary motion to propel bicycle 2 forwardly.

As each pedal lever 14 pivots about pinion 18, pedal lever 14 is freely and smoothly pivotal as it will pivot about bearing 50 press fit onto each end pinion 18. Racks 48 in slots 42 of pedal levers 14 will simply walk around the teeth of pinion 18 during this pivotal motion of pedal levers 14. Pinion 18 itself is held stationary by the engagement of pinion 18 with racks 58 in slot 52 of frame 4.

If the operator desires to change the transmission ratio of bicycle 2, the operator uses rotary handle 70 to rotate adjustment rod 82 to thereby pull up or push down on the adjustment rod 82 due to the threaded engagement between adjustment rod 82 and rotary handle 70. C-shaped bracket 84 simply pulls up or pushes down on bearing 60 in frame 4. Pinion 18 is free to slide through slots 42 in pedal levers 14 and through slot 52 in frame 4 since pinion 18 can rotate along racks 48 and 58. When pinion 18 has been shifted a desired amount, the operator can cease turning rotary handle 70. Pinion 18 will now be held in a new adjusted position to provide a different transmission ratio.

Bicycle 2 shown in FIGS. 1–7 has a simple, durable and reliable structure, particularly the structure for shifting pivot axis 16 of pedal levers 14 back and forth. A single pinion 18 is used extending through slots 42 in both pedal levers 14 and through a slot 52 in frame 4. Bearings 50 are press fit around the ends of pinion 18 to pivotally mount pedal levers 14 by being received in slots 42 in pedal levers 14. A similar bearing 60 is press fit around the middle of pinion 18 to serve as an attachment point for adjustment rod 82 used to move pinion 18 back and forth in frame 4. All of this is done along a single common axis, namely along the pivot axis 16 formed by pinion 18.

Figure 8:
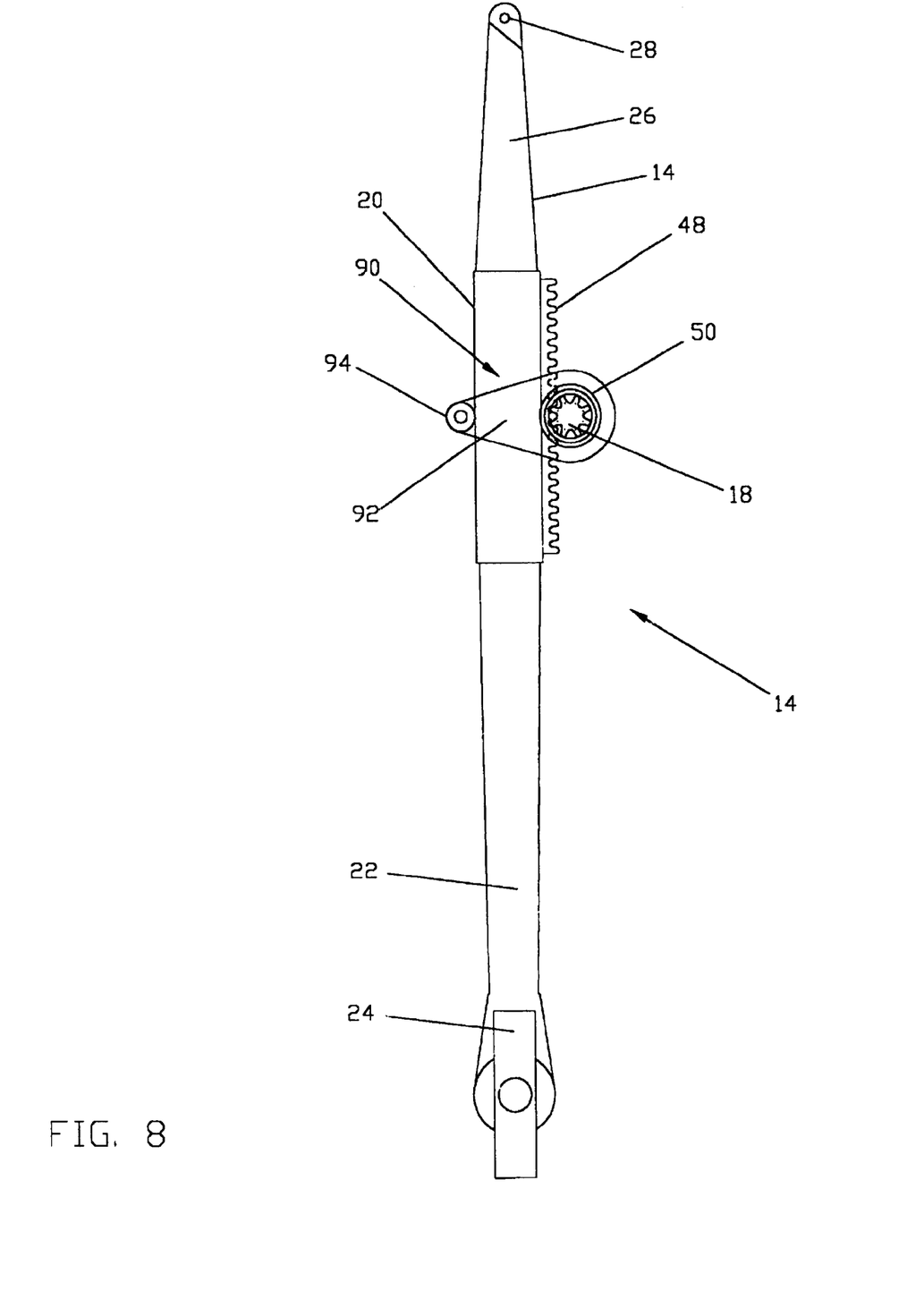
FIG. 8 is a side elevational view of an alternative form of the pedal lever that can be used in the bicycle shown in FIG. 1.
Figure 9:
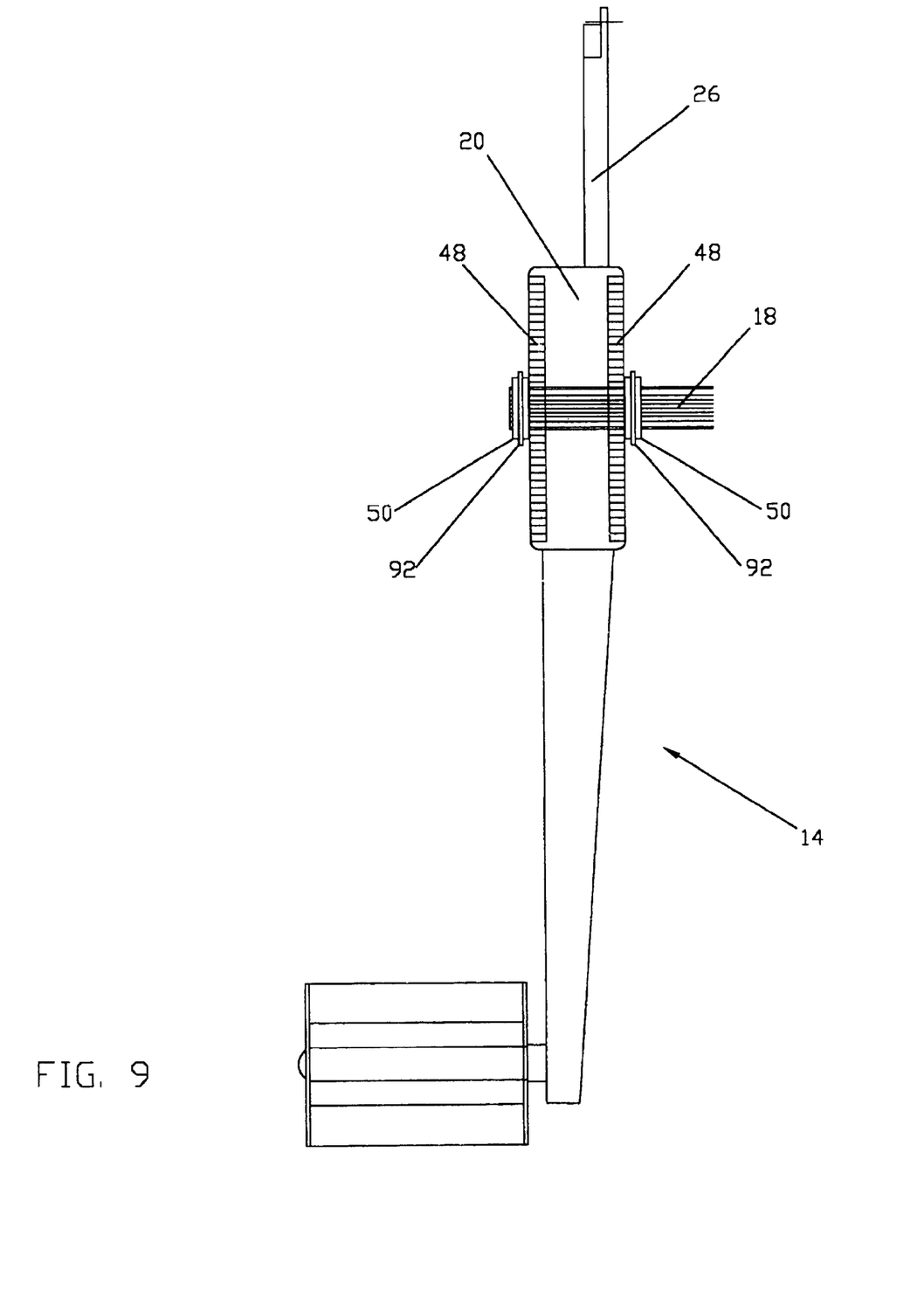
FIG. 9 is a bottom plan view of the alternative form of the pedal lever shown in FIG. 8.
Figure 10:
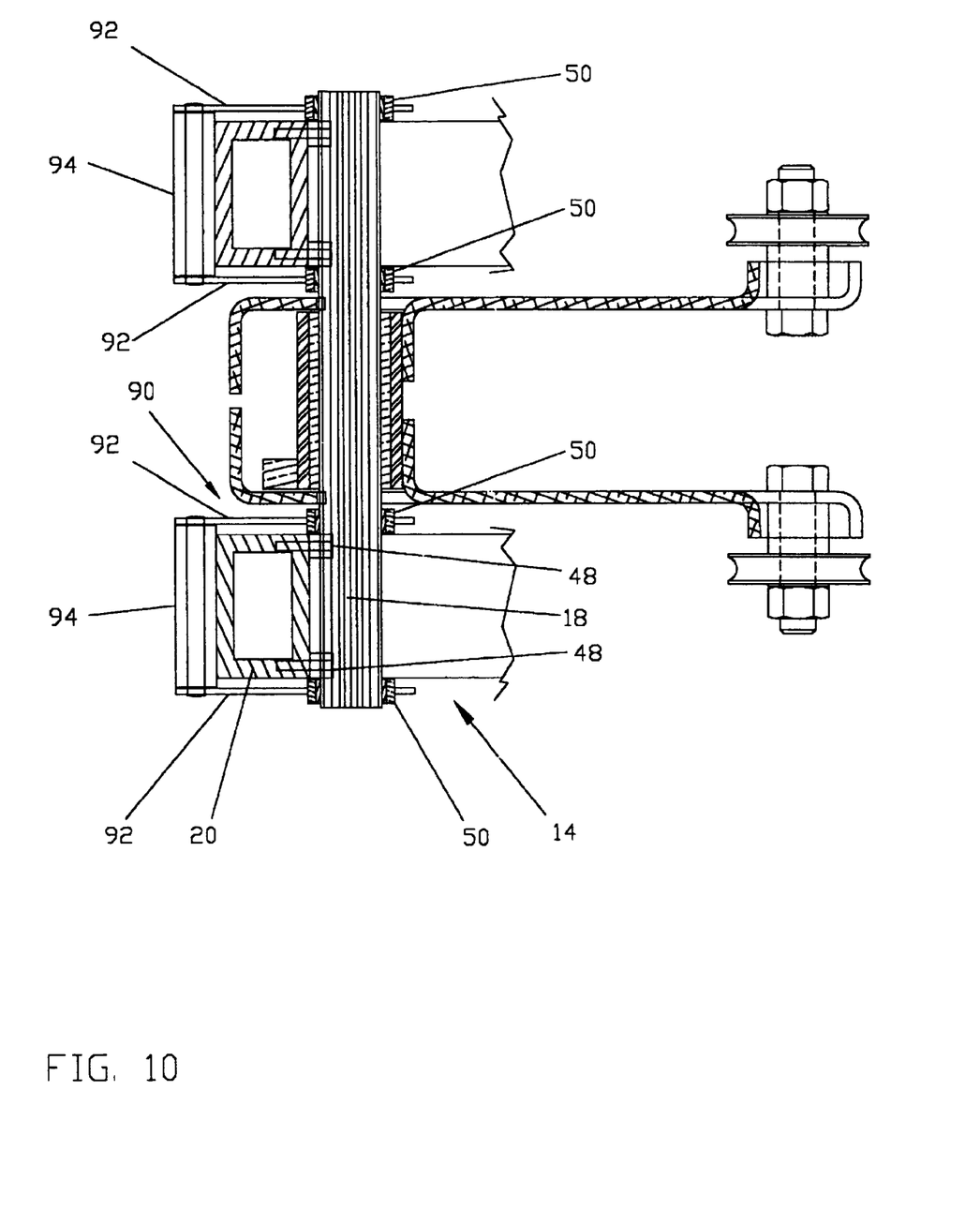
FIG. 10 is a cross-sectional view similar to FIG. 4 but showing the bicycle with the alternative form of the pedal lever shown in FIG. 8.

FIGS. 8–10 show an alternate form of pedal lever 14. In this form, the intermediate portion of pedal lever 14 has no slot but has a closed tubular configuration. The spaced, parallel racks 48 are mounted to either side of the tubular intermediate portion of pedal lever 14 by suitably affixing them to the exterior of one of the walls of the tubular intermediate portion of pedal lever 14. The end of pinion 18 is held against racks 48 by a U-shaped yoke 90 having a pair of spaced parallel ears 92 carrying a rotatable roller 94. Roller 94 engages against an opposite wall of the tubular intermediate portion of pedal lever 14 from the wall that carries racks 48. Each ear 92 of yoke 90 has a bearing 50 that is press fit around pinion 18.

Thus, in the alternate form of pedal lever 14 shown in FIGS. 8–10, the ends of pinion 18 are still held against spaced parallel racks 48 on the intermediate portion of pedal lever 14. However, rather than having a bearing 50 that is internally contained in a slot 42 in the intermediate portion of pedal lever 14, a pair of external bearings 50 are used in the ears 92 of an external yoke 90. When pinion 18 is adjusted by using threaded adjustment rod 82, the roller 94 on yoke 92 simply rolls along the opposite wall of the intermediate portion while pinion 18 rolls along racks 48. Bearings 50 around pinion 18 are still positioned along pivot axis 16 as in the earlier described embodiment of FIGS. 1–7.

Figure 11:
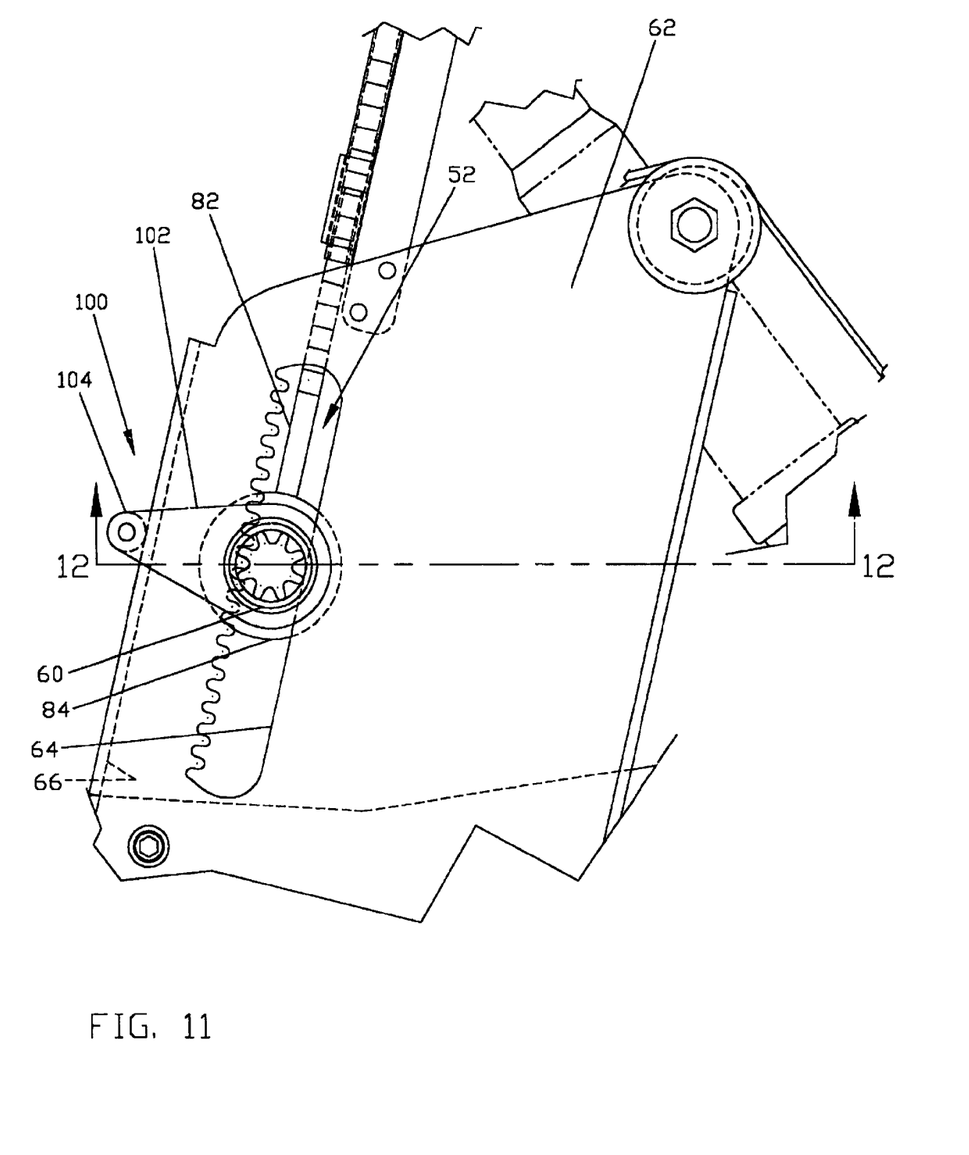
FIG. 11 is a side elevational view of an alternative form of the frame of the bicycle shown in FIG. 1.
Figure 12:
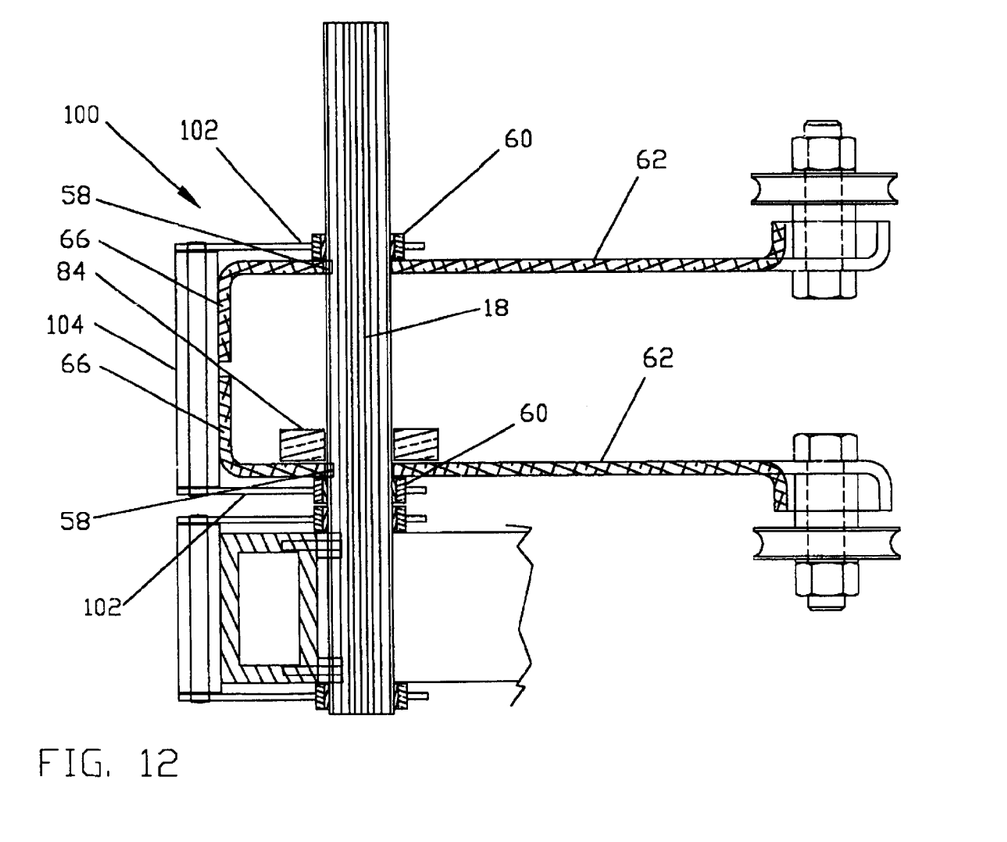
FIG. 12 is a cross-sectional view of the alternative form of the frame taken along lines 12—12 of FIG. 11.

Similarly, as shown in FIGS. 11 and 12, a pair of external bearings 60 can be used to support pinion 18 on frame 4, rather than using an internal bearing 60. In this embodiment, a U-shaped yoke 100 having a pair of pivotal ears 102 is received around side plates 62 with the ears 102 being located externally to side plates 62. The base of yoke 100 carries a roller 104 that rolls along an external surface defined by inwardly turned side walls 66 on each side plate 62. A bearing 60 is located in each ear 102 of the 100 to rotatably receive pinion 18 adjacent each side plate 62. A circular, donut-shaped bracket 84 on the lower end of threaded adjusting rod 82 now simply surrounds pinion 18, pinion 18 being rotatable within bracket 84 and along racks 58 during an adjustment operation.

Figure 13:
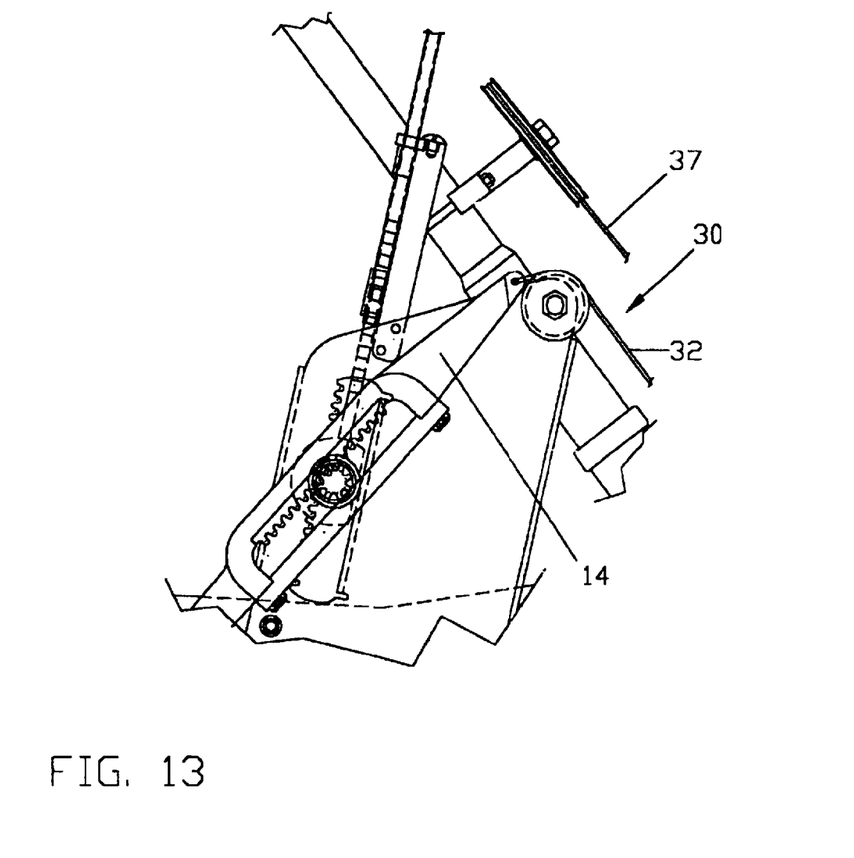
FIG. 13 is a side elevational view of an alternative form of the motion transmitting member of the bicycle shown in FIG. 1.
Figure 14:
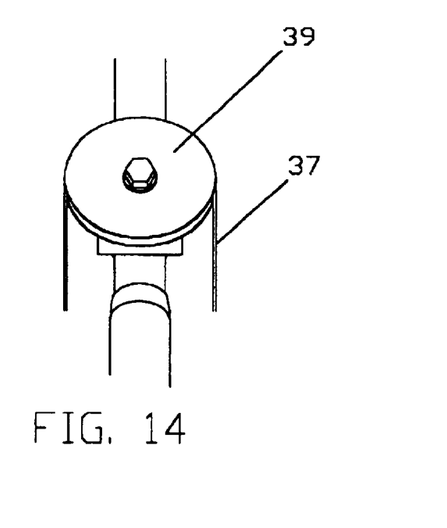
FIG. 14 is a front elevational view of a portion of the alternative form of the motion transmitting member of FIG. 13.

FIGS. 13 and 14 show an alternate form of motion transmitting member 30 for coupling pedal levers 14 to drive sprockets 40 on the hub of front wheel 6. In this form, the spring section 36 of each motion transmitting member 30 is deleted and replaced by a third cable section 37 that connects the two chain sections 34 of motion transmitting members 30. The third cable section 37 is entrained around an idler pulley 39 on the steering post of frame 4 of bicycle 2. In this form, the two motion transmitting members 30 are connected together by the third cable section 37 so that motion of one member 30 will move the other member 30 as well, i.e. retracting one member 30 will extend the other member 30 and vise versa.

Bicycle 2 shown in FIGS. 1–8 comprises a recumbent bicycle in which the operator when seated has his or her legs in an approximately horizontal position when operating pedal levers 14. However, this invention is not limited to that type of bicycle, but can also be used on an upright bicycle 120 as shown in FIG. 15.

Figure 15:
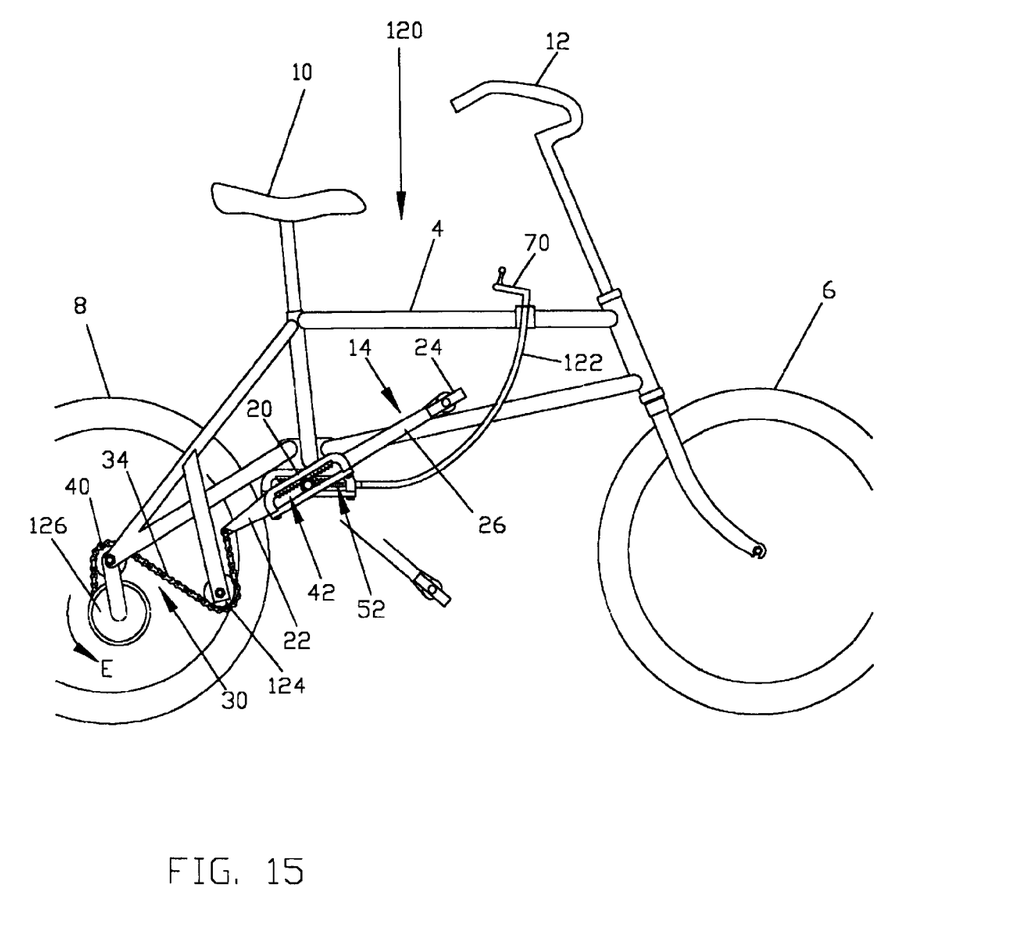
FIG. 15 is a side elevational view of a second embodiment of a bicycle according to this invention.

Referring to FIG. 15, upright bicycle 120 includes a seat 10. When the operator is seated on seat 10, the operator's legs are positioned substantially vertically. Pedals 24 are located on the front ends 26 of pedal levers 14 and the operator reciprocates pedal levers 14 up and down by pushing down alternately on the pedals 24 of the two opposed pedal levers. The rear ends 22 of pedal levers 14 are connected by motion transmitting members 30 to drive sprockets 40 on a hub of rear wheel 8.

Each pedal lever 14 is slotted at 42 and frame 4 has a slot 52 much like slots 42 and 52 described with respect to the embodiment of FIGS. 1–7 except that slot 52 in frame 4 is now substantially horizontal rather than vertical and is located generally beneath seat 10 rather than in front of seat 10. The use of dual racks 48 along the sides of each slot 42, a single pinion 18, and internal bearings 50 around each end of pinion 18, as was described for the embodiment of FIGS. 1–7, is still the same. The same is true for slot 52 in frame 4 and internal bearing 60 around the middle of pinion 18.

A rotary handle 70 is still used to shift the position of pinion 18. However, due to the greater distance involved, the rotary movement of rotary handle 70 is used to extend or retract a flexible cable 122 that pulls or pushes on bearing 60 received in slot 52 in frame 4. Such movement obviously adjusts the transmission ratio in the same manner as was described with respect to the embodiment of FIGS. 1–7.

Motion transmitting members 30 in this embodiment can comprise a first section of chain 34 entrained around an idler pulley 124 and drive sprocket 40. The end of the first section of chain 34 can be connected to a negator spring 126 that is biased in a direction that tends to wind chain 34 up to keep chain 34 tightened, as indicated by the arrow E in FIG. 15.

Various modifications of this invention will be apparent to those skilled in the art. For example, while this invention has been described for use on a cycle comprising a two wheel bicycle 2, it could be used on a cycle having three wheels arranged in a tricycle configuration. In addition, while foot operated pedals 24 have been shown on pedal levers 14, pedal levers 14 could be reoriented to permit the use of hand operated pedals. Thus, the scope of this invention is to be limited only by the appended claims.

I claim:

1. A manually propelled cycle, which comprises:
   (a) a frame which is supported for rolling over the ground by a front wheel and at least one rear wheel, both wheels being rotatably carried on the frame;
   (b) a seat on the frame to accommodate a seated operator;
   (c) a steering handle on the frame to steer the frame;
   (d) reciprocal pedal levers connected to the frame for pivoting about a pivot axis, each pedal lever being connected to a motion transmitting member for transmitting reciprocal motion of the pedal lever to a hub of one of the wheels on the frame for propelling the frame;
   (e) wherein the frame and the pedal levers each have at least one rack affixed thereto, wherein the pivot axis of the pedal levers is formed by a pinion engaged with the racks on the frame and the pedal levers; and
   (f) a plurality of bearings received around the pinion with at least one bearing extending between the pinion and the frame and at least one bearing extending between the pinion and each of the pedal levers.

2. The cycle of claim 1, further including an adjustment member on the frame attached to the pinion for moving the pinion back and forth along the rack on the frame to adjust the transmission ratio of the cycle.

3. The cycle of claim 1, wherein the pedal levers and frame are each formed with a slot through which the pinion passes, and wherein the bearings are internally located within the slots in the pedal levers and the frame.

4. The cycle of claim 3, wherein each slot has a rack located along one side thereof such that dual parallel racks are carried on the frame and on each pedal lever, and wherein the bearings in the slots are located so that one bearing is located in each slot between the dual parallel racks along the sides of the slot.

5. The cycle of claim 3, wherein the adjustment member is coupled to the bearing in the slot in the frame for pulling or pushing the bearing in the slot in the frame back and forth relative to the slot, the pinion rotating along the racks in the pedal levers and the frame during the adjustment.

6. The cycle of claim 1, wherein the pedal levers each include a yoke surrounding the pedal lever with the yoke having a pair of parallel ears, the ears each mounting an external bearing in which the pinion is received with the pinion being held against a rack on one exterior wall of the pedal lever.

7. The cycle of claim 6, wherein the yoke has a base that includes a roller for rolling along an opposed exterior wall of the pedal lever.

8. The cycle of claim 6, wherein the frame includes a yoke that rolls along a fixed portion of the frame carrying the rack on the frame, the yoke having a pair of parallel ears, the ears each mounting an external bearing in which the pinion is received with the pinion being held against the rack on the frame.

9. The cycle of claim 1, wherein the pinion passing through the frame and the pedal levers comprises a single pinion.

10. The cycle of claim 1, wherein the cycle is a bicycle.

11. The cycle of claim 10, wherein the cycle is a recumbent bicycle with the front wheel being driven by the pedal levers.

12. The cycle of claim 10, wherein the cycle is an upright bicycle with the at least one rear wheel being driven by the pedal levers.

13. The cycle of claim 2, wherein the adjustment member includes a rotary handle adjacent the seat for allowing rotation of the handle about a substantially vertical axis pull or push the pinion back and forth depending upon the direction of rotation of the handle.

14. The cycle of claim 13, wherein the rotary handle has a threaded lower end in which a threaded adjustment rod is received, wherein rotation of the handle causes the adjustment rod to be drawn into or extended from the rotary handle, the adjustment rod being connected to the pinion.

15. The cycle of claim 14, wherein the adjustment rod is connected to the pinion by a bracket carried on a lower end of the adjustment rod.

16. The cycle of claim 15, wherein the bracket directly surrounds the pinion to connect to the pinion.

17. The cycle of claim 16, wherein the bracket directly surrounds a bearing received around the pinion to connect to the pinion through the bearing.

18. The cycle of claim 13, wherein the rotary handle connects to the pinion through an elongated cable.

19. The cycle of claim 1, wherein the pedal levers carry foot operated pedals.

20. A manually propelled cycle, which comprises:
   (a) a frame having a rack thereon, the frame being supported by at least a pair of ground engaging wheels;
   (b) reciprocal pedal levers carried on the frame and connected to at least one ground engaging wheel for propelling the frame, the reciprocal pedal levers comprising a left pedal lever with a rack and a right pedal lever with a rack;
   (c) a pinion carried on the frame with the pinion in simultaneous engagement with the racks on the frame and the pedal levers;
   (d) a plurality of bearings mounted around the pinion comprising at least:
      (i) a first bearing providing rotation between the pinion and the frame;
      (ii) a second bearing providing rotation between the pinion and the right pedal lever; and
      (iii) a third bearing providing rotation between the pinion and the left pedal lever.

* * * * *

UNITED STATES PATENT AND TRADEMARK OFFICE
CERTIFICATE OF CORRECTION

PATENT NO. : 6,749,211 B1
DATED : June 15, 2004
INVENTOR(S) : Hugo H. Yliniemi It is certified that error appears in the above-identified patent and that said Letters Patent is hereby corrected as shown below:

Column 7,
Line 49, change "claim 3" to -- claim 2 --.

Signed and Sealed this

Seventh Day of December, 2004

JON W. DUDAS
*Director of the United States Patent and Trademark Office*